United States Patent
Przygienda et al.

(10) Patent No.: US 9,544,240 B1
(45) Date of Patent: Jan. 10, 2017

(54) MTU DISCOVERY OVER MULTICAST PATH USING BIT INDEXED EXPLICIT REPLICATION

(71) Applicant: Telefonaktiebolaget L M Ericsson (publ), Stockholm (SE)

(72) Inventors: Antoni Przygienda, Sunnyvale, CA (US); Gregory Mirsky, Pleasanton, CA (US)

(*) Notice: Subject to any disclaimer, the term of this patent is extended or adjusted under 35 U.S.C. 154(b) by 66 days.

(21) Appl. No.: 14/798,297

(22) Filed: Jul. 13, 2015

(51) Int. Cl.
*H04L 12/28* (2006.01)
*H04L 12/805* (2013.01)
*H04L 12/18* (2006.01)

(52) U.S. Cl.
CPC .............. *H04L 47/36* (2013.01); *H04L 12/18* (2013.01)

(58) Field of Classification Search
USPC ............... 370/392, 390, 401, 432, 256, 252
See application file for complete search history.

(56) References Cited

U.S. PATENT DOCUMENTS

| | | | |
|---|---|---|---|
| 2006/0221844 A1 | 10/2006 | Subramanian et al. | |
| 2010/0322249 A1* | 12/2010 | Thathapudi | H04L 47/10 370/395.1 |
| 2011/0317696 A1 | 12/2011 | Aldrin et al. | |
| 2014/0233565 A1 | 8/2014 | Mahapatra | |
| 2015/0071067 A1* | 3/2015 | Martin | G06F 11/2002 370/235 |
| 2015/0131658 A1* | 5/2015 | Wijnands | H04L 45/16 370/390 |
| 2016/0127139 A1* | 5/2016 | Tian | H04L 45/16 370/390 |
| 2016/0142248 A1* | 5/2016 | Thubert | H04L 61/6004 370/392 |

OTHER PUBLICATIONS

RFC 1191: Mogul, et al., "Path MTU Discovery," IETF MTU Discovery Working Group Request for Comments, Nov. 1990, 19 pages.
RFC 1981: McCann, et al., "Path MTU Discovery for IP version 6," Network Working Group Request for Comments, Aug. 1996, 15 pages.
RFC 4821: Mathis, et al., "Packetization Layer Path MTU Discovery," The IETF Trust, Network Working Group Request for Comments, Mar. 2007, 32 pages.
Mirsky, G., et al., "Path Maximum Transmission Unit Discovery (PMTUD) for Bit Index Explicit Replication (BIER) Layer," draft-ietf-bier-path-mtu-discovery-00, PMTUD for BIER, Jul. 18, 2016, pp. 1-8.

* cited by examiner

*Primary Examiner* — Duc C Ho
(74) *Attorney, Agent, or Firm* — Nicholson, De Vos, Webster & Elliot, LLP (57) ABSTRACT

A method and system provides for path maximum transmission unit (PMTU) discovery (PMTUD) for a multicast distribution implemented in a network using bit indexed explicit replication (BIER) architecture. The network has a set of bit forwarding routers (BFRs) that form a BIER domain including at least one ingress BFR (BFIR) and a set of egress BFRs (BFERs). The method improves efficiency of the PMTUD by limiting probe packet traffic. The method includes selecting a BFER from the set of BFERs in the BIER domain to be processed, generating a probe packet to the selected BFER using a current MTU, sending the probe packet to the selected BFER, and updating the current MTU and adding BFERs identified by a response to the probe packet to the set of BFERs in the BIER domain to be processed.

20 Claims, 7 Drawing Sheets

MTU DISCOVERY OVER MULTICAST PATH USING BIT INDEXED EXPLICIT REPLICATION

FIELD

Embodiments of the invention relate to the field of maximum transmission unit (MTU) discovery and more specifically, to a method and system for MTU discovery over multicast using bit indexed explicit replication (BIER).

BACKGROUND

In networks such as Internet Protocol (IP) networks, when a host seeks to transmit a sizable amount of date to a target destination in the network the data is transmitted as a set of datagrams. In most cases it is more efficient to send the data using the largest possible datagrams such that these datagrams do not have to be fragmented at any point along the path from the host to the destination. Fragmentation occurs on hops along the route where an MTU is smaller than the size of the datagram. To avoid such fragmentation the MTU for each hop along a path from a host to a destination must be known to select an appropriate datagram size. Such MTU determination along a specific path is referred to as path MTU discovery or PMTU discovery (PMTUD).

Current PMTUD mechanisms are primarily targeted to work on point-to-point paths, i.e. unicast paths. These mechanisms use packet fragmentation control by disabling fragmentation of the probe packet. As result, a transient node that cannot forward a probe packet due to it being too large for the MTU of the next hop, instead sends an error message back to the ingress node of the path being tested. If the probe packet successfully traverses the path then the egress node responds with a positive notification. Thus, through a series of iterations where the probe packet size is incrementally reduced and/or increased, the ingress node of the path can discover a PMTU of the particular path. Packet fragment control works in Internet Protocol v4 Networks, however, IPv6 networks do not support fragmentation.

Bit indexed explicit replication (BIER) is a multicast forwarding architecture that is designed to efficiently handle multicast without requiring an explicit tree-building protocol or the maintenance of flow state by intermediated nodes. Routers in network that support BIER are referred to as Bit-Forwarding Router (BFR). A BIER domain consists of BFRs that are uniquely identified by BFR-id. An ingress border router, a Bit Forwarding Ingress Router (BFIR), inserts a Bit Mask Set (BMS) into a packet. Each targeted egress node, a Bit Forwarding Egress Router (BFER), is represented by Bit Mask Position (BMP) in the BMS. A transit or intermediate BIER node, a BFR, forwards BIER encapsulated packets to BFERs, identified by respective BMPs, according to a Bit Index Forwarding Table (BIFT) built based on domain-wide Bit Forwarding Tree (BFT).

The existing solutions for PMTUD are inefficient for point-to-multipoint paths constructed for multicast traffic. Probe packets must be flooded through the whole set of multicast distribution paths over and over until the very last egress responds with a positive acknowledgement.

SUMMARY

In one embodiment, a method is provided for path maximum transmission unit (PMTU) discovery (PMTUD) for a multicast distribution implemented in a network using bit indexed explicit replication (BIER) architecture. The network has a set of bit forwarding routers (BFRs) that form a BIER domain including at least one ingress BFR (BFIR) and a set of egress BFRs (BFERs). The method improves efficiency of the PMTUD by limiting probe packet traffic. The method includes selecting a BFER from the set of BFERs in the BIER domain to be processed, generating a probe packet to the selected BFER using a current MTU, sending the probe packet to the selected BFER, and updating the current MTU and adding BFERs identified by a response to the probe packet to the set of BFERs in the BIER domain to be processed.

In another embodiment, a network device implements a method for PMTUD for a multicast distribution implemented in a network using BIER architecture. The network has a set of BFRs that form a BIER domain including at least one BFIR and a set of BFERs. The method improves efficiency of the PMTUD by limiting probe packet traffic. The network device includes a non-transitory machine-readable storage medium having stored therein a PMTUD module and a network processor coupled to the non-transitory machine-readable storage medium. The network processor is configured to execute the PMTUD module. The PMTUD module is configured to select a BFER from the set of BFERs in the BIER domain to be processed, to generate a probe packet to the selected BFER using a current MTU, to send the probe packet to the selected BFER, and to update the current MTU and to add BFERs identified by a response to the probe packet to the set of BFERs in the BIER domain to be processed.

In one embodiment, a computing device executes a plurality of virtual machines for implementing network function virtualization (NFV), wherein a virtual machine from the plurality of virtual machines is configured to implement a method for PMTUD for a multicast distribution implemented in a network using BIER architecture. The network has a set of BFRs that form a BIER domain including at least BFIR and a set of BFERs. The method improves efficiency of the PMTUD by limiting probe packet traffic. The computing device includes a non-transitory machine-readable storage medium having stored therein a PMTUD and a processor coupled to the non-transitory machine-readable storage medium. The processor is configured to execute a virtual machine from the plurality of virtual machines. The virtual machine is configured to execute the PMTUD module. The PMTUD module is configured to select a BFER from the set of BFERs in the BIER domain to be processed, to generate a probe packet to the selected BFER using a current MTU, to send the probe packet to the selected BFER, and to update the current MTU and to add BFERs identified by a response to the probe packet to the set of BFERs in the BIER domain to be processed.

In a further embodiment, a control plane device is configured to implement a control plane of a software defined networking (SDN) network including a plurality of network devices forming a content centric network. The control plane device implements a method for PMTUD for a multicast distribution implemented in a network using bit indexed explicit replication (BIER) architecture. The network has a set of BFRs that form a BIER domain including at least one BFIR and a set of BFERs. The method improves efficiency of the PMTUD by limiting probe packet traffic. The control plane device a non-transitory machine-readable storage medium having stored therein a PMTUD module, and a processor coupled to the non-transitory machine-readable storage medium. The processor is configured to execute the PMTUD module. The PMTUD module is configured to select a BFER from the set of BFERs in the BIER domain to be processed, to generate a probe packet to the selected BFER using a current MTU, to send the probe packet to the selected BFER, and to update the current MTU and to add BFERs identified by a response to the probe packet to the set of BFERs in the BIER domain to be processed.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

The following description describes methods and apparatus for a method and system for path maximum transmission unit (PMTU) discovery. The method and system utilized the Bit Indexed Explicit Replication (BIER) architecture to make PMTU determinations. A BFIR in the BIER domain selects a set of BFERs for a specific multicast distribution. By explicitly utilizing the subset of targeted BFERs that the BFIR identifies for the multicast distribution, the PMTU can be determined by transmitting a series of probe packets to each of the BFERs to obtain the PMTU to each BFER. This discovery process is an iterative process beginning with the transmission of small probe packets to each of the BFERs and iteratively decreasing the size of the transmitted probe packets in response to a failure to forward the probe packets occurs along the route to the BFERs due to a MTU of the probe packets being too large to forward without fragmentation. The process continues to resend iteratively smaller probe packet until all of the BFERs can be successfully reached which enables the identification of a PMTU to the BFER. In the case of such a failure at an intermediate BFR that is forwarding the probe packets towards the set of downstream BFERs, the BFR responds with an error notification that includes the bit mask identifying the intended BFER. Providing this information allows for subsequent iterations of a probe packet with a smaller MTU target for only those downstream BFERs identified in response to this failure instead of requiring that a probe packet be flooded to all BFERs in the BEIR domain thereby reducing the overhead and increasing the efficiency of the process.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Overview

A network the implements the embodiments, utilizes Bit Indexed Explicit Replication (BIER) and is a member of the BIER domain. The ingress Bit-Forwarding Router (BFR), i.e. the BFIR manages the process of determining the path maximum transmission unit (PMTU) for each of the egress BFRs, i.e. the BFERs) for a given multicast distribution. The BEIR system encapsulates the probe packets with a header that includes a bit mask set (BMS) where each position in the BMS, i.e. each bit map position (BMP), The BFIR sets BMPs of all BFERs to be sent a packet probe as part of the discovery process into the BMS. In one example embodiment, the set S, all bits for all targeted BFERs, is the BMS value. The BFIR sets the set of pending probes P to a single element equivalent to S and a value M (max) to the MTU of the link of the BFIR to the BIER domain.

For all elements E of the set of pending probes P the BFIR sends a packet probe with a packet size determined using the starting MTU M' that has been assigned to the BFIR and then sets the BIER BFER bits in the element E. The packet probe, may be a BIER-encapsulated Internet Control Packet (ICMP) packet, with a "Don't Fragment" bit set in the the IPv4 header or an equivalent packet type including the equivalent IPv6 packet. The header can have further information to be filled in (e.g., max. MTU allowed, and IP address of the sender). Any BFR that receives the probe packet and that cannot forward BIER packet due to the size being greater than the MTU of the next hop will send an ICMP "Fragmentation Needed" message to the BFIR, if the probe packet is IPv4 packet. In other embodiments, equivalent response packets are sent dependent on the protocol employed. For example, if the probe packet is IPv6 packet, then an ICMPv6 "Packet Too Big" message can be sent to the BFIR. The BFR sending the ICMPv6 message lists its downstream BFERs by including their BMPs in the BMS. This BMS is included in the response message that the BFR sends back to the BFIR. This bitmask allows the BFIR to target the next iteration of probe packets to be sent such that the next smaller probe packets can be target at those BFERs identified in the response messages instead of flooding paths to all of the BFERs at very significant gains in number of probe packets necessary to determine PMTUs and the associated overhead for their distribution in the network. The embodiments makes MTU discovery for BIER multicast distribution path more efficient by limiting the sending of probe packets to those BFERs that had not yet responded to MTU probe.

Figure 1:
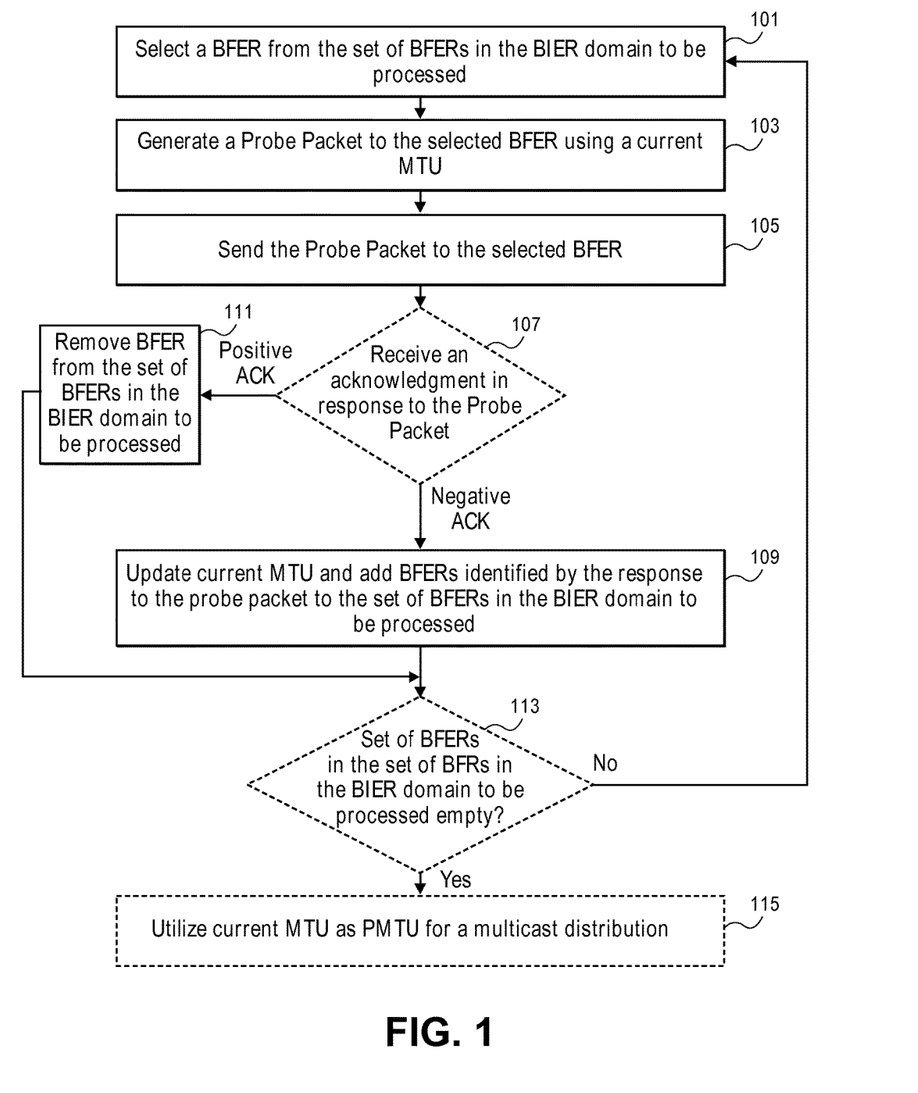
FIG. 1 is a flow chart of one embodiment of a PMTU discovery (PMTUD) process for BIER multicast distribution.

FIG. 1 is a flow chart of one embodiment of a PMTU discovery (PMTUD) process for BIER multicast distribution. In one embodiment, the process is applied to a specific multicast distribution or multicast tree that has been determined and is managed using the BIER architecture. As discussed above, in one embodiment the process may utilize a data structure representing a set of BFRs in the Bit Forwarding Tree (BFT) associated with the multicast distribution. The set of BFRs, for example a set of BFRs P in a BIER domain associated with the multicast distribution is identified with each BFER being considered an element E in the set P. As a starting point the PMTUD process starts with a MTU value M that is configured to be a maximum possible PMTU where the size of this MTU value is reduced when a hop along a path is found to have a smaller MTU. This max MTU M can be operator configured or similarly defined.

The process can be initiated by selecting a BFER or set of BFERs to be probed from the set of BFERs in the BIER domain to be processed as part of the PMTUD process (Block 101). Initially, elements representing all the BFERs associated with the multicast distribution are added to the set to be processed (e.g., set P). The process is an iterative process selecting each element E in the set P to be processed, in other words selecting each BFER in the set of BFERs to be processed. A probe packet to be sent to the selected BFERs is then generated where the size of the probe packet is a current MTU, which is a max MTU value M (Block 103).

The generated probe packet is then sent to the selected BFER (Block 105). In some embodiments, the generated probe packet is broadcast to a set of initial BFER destinations in the set P.

In response the BFIR that is sending the probe packets will receive a response to each probe packet along each set of routes to the BFERs. These responses are either positive acknowledgements or negative acknowledgements (acks). Each response is checked to determine what type of acknowledgement is received (Block 107). Where the response is a positive acknowledgement the BFER is removed from the set of BFERs (elements E in set P) to be processed (Block 111). A check is then made whether further BFERs remain to be processed in the set (whether any elements E still populate the set P) (Block 113). If the set of BFERs to be processed is empty, then the process completes and the current MTU (in this case the max MTU value M) is selected for use in transmissions for the associated multicast group (Block 115). If the set of BFERs in the set of BFERs in the BIER domain is not exhausted then the process continues to select a next BFER or set of BFERs to be processed (Block 101).

In the scenario where the response is a negative acknowledgement, then the process updates the current MTU by decreasing its value a set amount, to a next listed value or by use of a similar reduction. The process also examines the BIER response to examine a BMS in the response to identify the set of BFERs that are downstream from the point of failure providing the BFIR with the information necessary to target further probe packets to BFERs where a compatible Path MTU has not yet been determined (Block 109). A check is then made whether the set of BFERs in the set of BFERs in the BIER domain to be processed is empty (Block 113). If the set is empty, then the process completes and utilizes the current MTU as the PMTU (Block 115). Whereas, if the set is not empty then the process continues to select the next BFER or set of BFERs (Block 101). In other embodiments, the process can also have a set timer that if expired causes the PMTUD process to end and to use the current MTU.

Figure 2A:
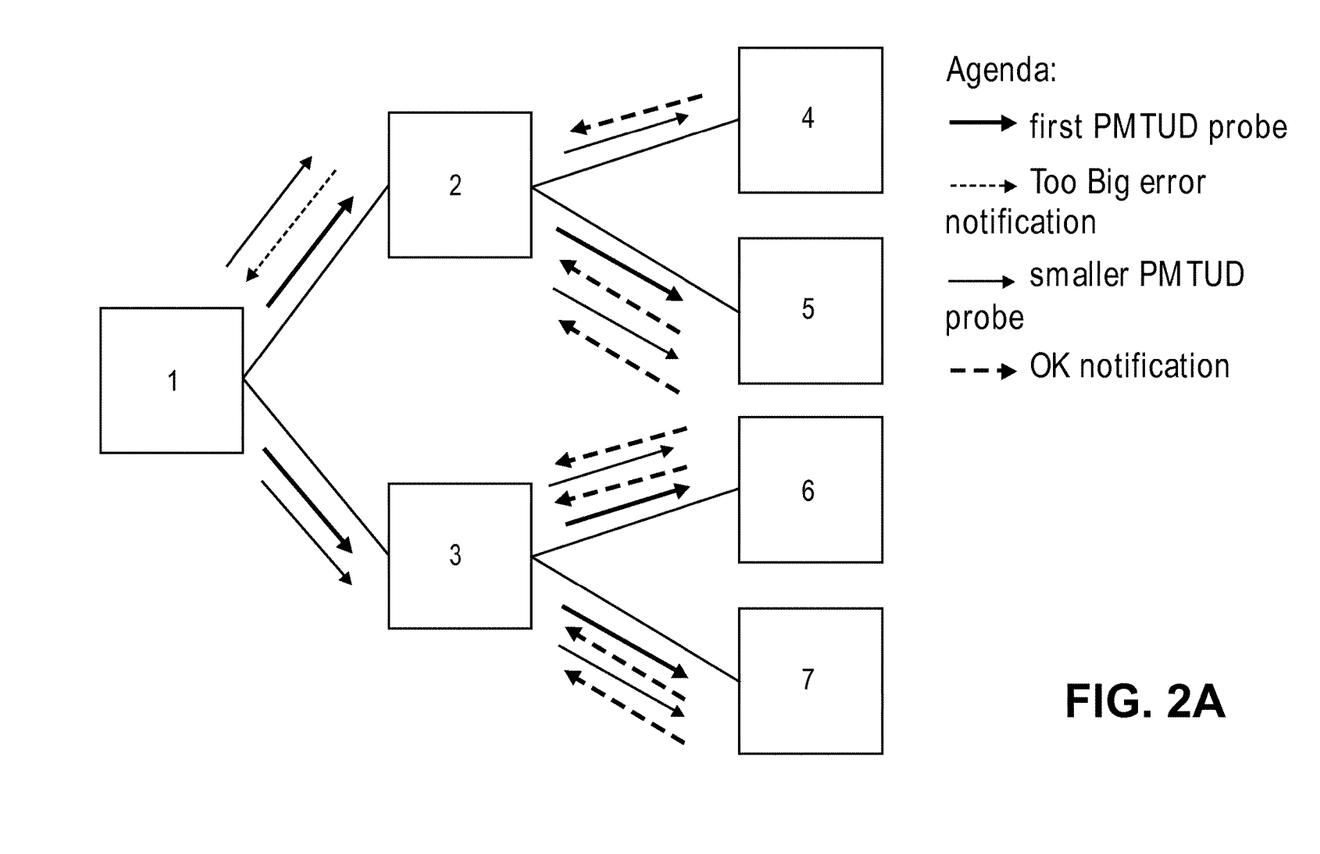
FIG. 2A is a diagram of an example application of the PMTUD process.
Figure 2B:
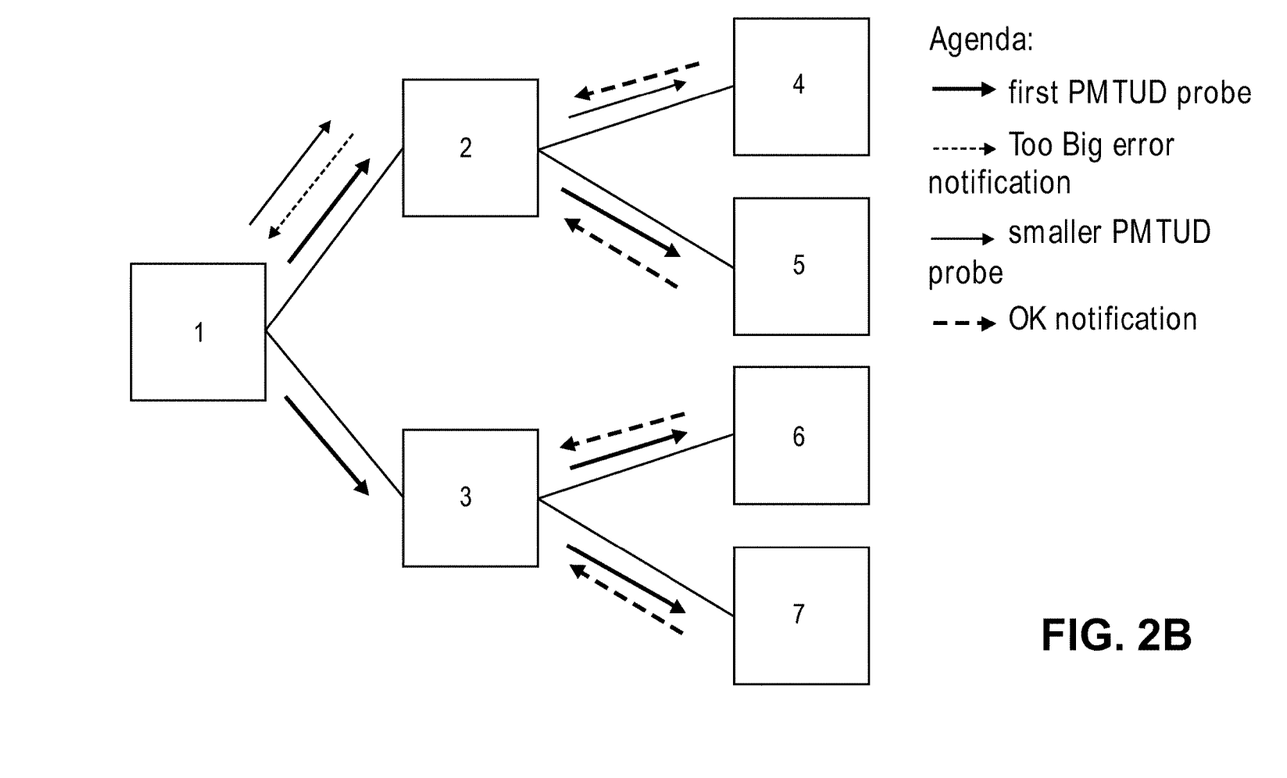
FIG. 2B is another diagram of an example application of the PMTUD process.

FIGS. 2A and 2B are diagrams of an example application of the PMTUD process. The figures illustrate an example network topology where the nodes of the topology are structured as a tree topology with node 1 being a BFIR and nodes 4, 5, 6 and 7 being BFERs in a network implementing the BIER architecture. In FIG. 2A the traffic generated and forwarded for the BIER multicast implementation shows the amount of traffic that would be generated using a standard PMTUD process. In the first PMTUD probe, the probe packets are flooded to all of the BFERs 4, 5, 6 and 7 via intermediate BFRs 2 and 3 from the ingress BFR (BFIR 1). This causes an error response to be sent from intermediate BFR 2. Positive acknowledgements are received from BFERs 6 and 7 via BFR 3 (the positive acknowledgements from the BFR to the BFIR are not shown for sake of clarity).

In response to receiving the error response from the BFR 2, however, a second PMTUD probe packet that is smaller in size is flooded into the BIER domain to all of the BFERs 4, 5, 6, and 7. Then in response to the second smaller PMTUD probe packet a set of positive acknowledgements are sent by the BFERs to the BFIR. This process generates a large amount of traffic and consumes significant resources across the network. However, only a sing link in this topology had an MTU that was below the initial PMUTD probe packet size. This example goes through two iterations of the discovery process, but one skilled in the art would appreciate that with a larger topology and greater variance in the MTUs across the links, then a greater number of iterations may be performed to arrive at a PMTU for the multicast distribution. Thus, the amount of resources and consumed by the process can scale significantly.

FIG. 2B is a diagram of the example application of the PMTUD process according to the embodiments described herein. In this example, the topology and MTUs of the links in the topology is consistent with that of the example of FIG. 2A. In this example, the improved PMTUD process is demonstrated where due to the targeted nature of the PMTUD process, significantly less traffic is generated to determine the PMTU. As in the first example, the first PMTUD probe packet is flooded from the BFIR 1 to all of the BFERs 4, 5, 6 and 7 in the BIER domain. Also, positive acknowledgements are sent by BFERs 5, 6 and 7 and an error message is sent from BFR 2 due to the MTU of the link to BFER 4 being smaller than the probe packet size. The improved PMTUD process at this point deviates from the standard PMUT discovery process. Instead of flooding smaller probe packets to all BFERs in the BIER domain, the PMTUD process sends only probe packets to the BFERs identified by the error message. Identifying the BFERs in the error message is also not present in the standard PMTUD process. As is illustrated, the second smaller PMUTD probe packet is sent toward BFER 4 and in this example a positive acknowledgement is received. This demonstrates that the improved PMTUD process significantly reduces the amount of probe packet traffic and the amount of acknowledgment and error message traffic in response. One skilled in the art would understand that this process improves scalability and performance in the BIER domain for managing PMTUD in connection with multicast distribution.

Architecture

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 3:
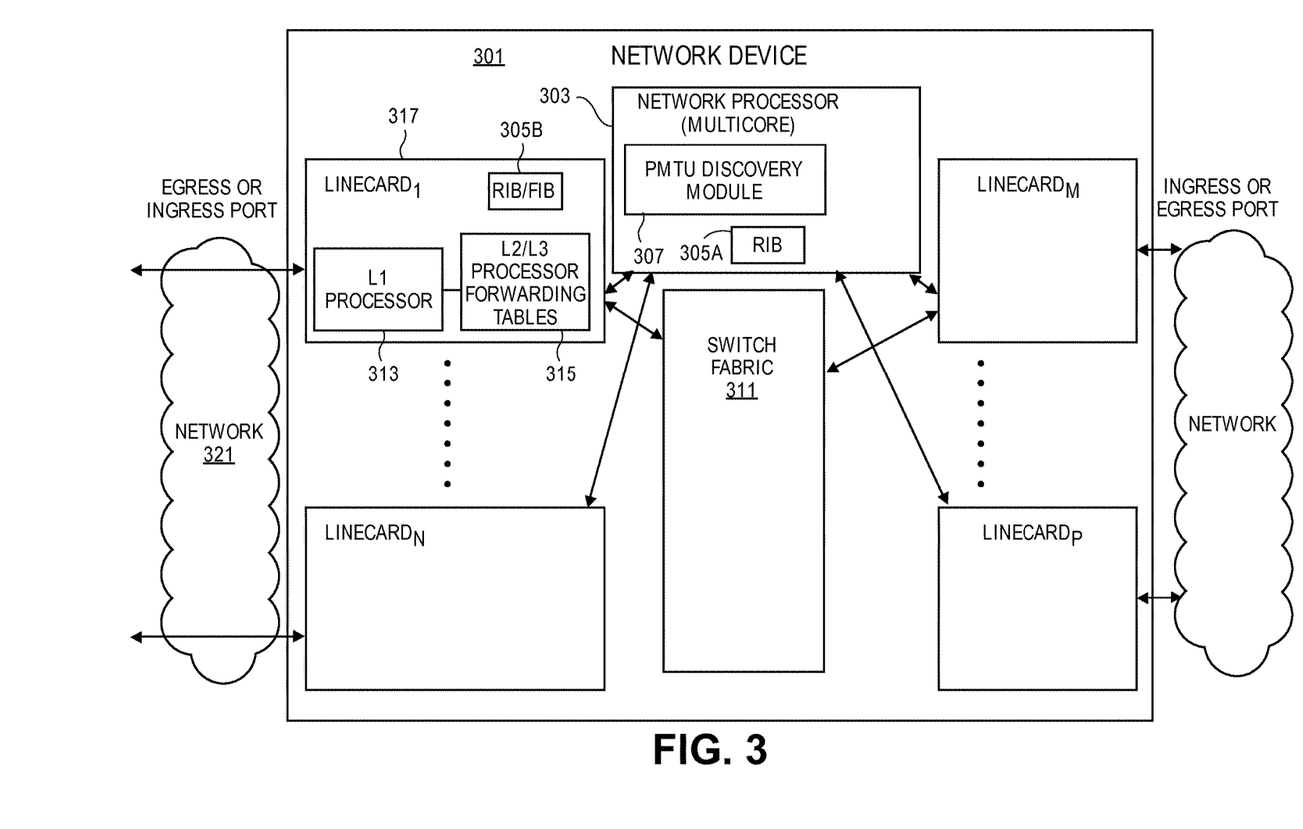
FIG. 3 is a diagram of one embodiment of a network device implementing the process.

FIG. 3 is a diagram of one embodiment of a network device implementing the PMTUD process and system. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In one embodiment, the route transforming process is implemented by a network device 301 or similar computing device. The network device 301 can have any structure that enables it to receive data traffic and forward it toward its destination. The network device 301 can include a network processor 303 or set of network processors that execute the functions of the network device 301. A 'set,' as used herein, is any positive whole number of items including one item. The network device 301 can execute a path MTU discovery module 307 to implement the functions for PMTUD as described herein above via a network processor 303.

The network device 301 connects with separately administered networks that have user equipment and/or content servers. The network processor 303 can implement the route transforming module 307 as a discrete hardware, software module or any combination thereof. The network processor 303 can also service the routing information base 305A and similar functions related to data traffic forwarding and network topology maintenance. The routing information base 305A can be implemented as match action tables that are utilized for forwarding protocol data units PDUs (i.e. packets). The functions of the path MTU discovery module 307 can be implemented as modules in any combination of software, including firmware, and hardware within the network device. The functions of the path MTU discovery module 307 that are executed and implemented by the network device 301 include those described further herein above.

In one embodiment, the network device 301 can include a set of line cards 317 that process and forward the incoming data traffic toward the respective destination nodes by identifying the destination and forwarding the data traffic to the appropriate line card 317 having an egress port that leads to or toward the destination via a next hop. These line cards 317 can also implement the forwarding information base 305B, or a relevant subset thereof. The line cards 317 can also implement or facilitate the path MTU discovery module 307 functions described herein above. The line cards 317 are in communication with one another via a switch fabric 311 and communicate with other nodes over attached networks 321 using Ethernet, fiber optic or similar communication links and media.

The operations of the flow diagrams have been described with reference to the exemplary embodiment of the block diagrams. However, it should be understood that the operations of the flowcharts could be performed by embodiments of the invention other than those discussed, and the embodiments discussed with reference to block diagrams can perform operations different from those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the network device 301 may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

Figure 4A:
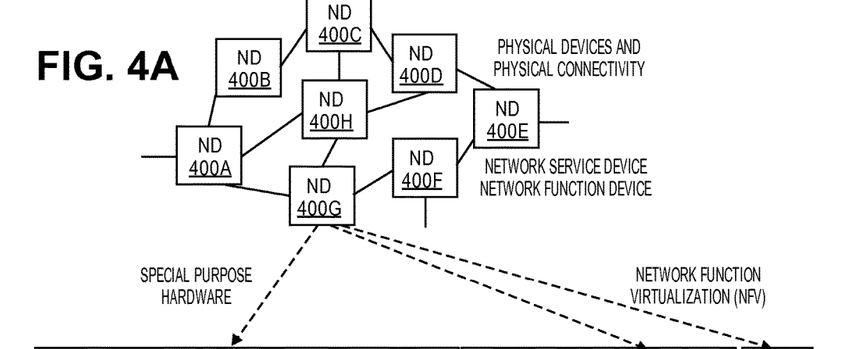
FIG. 4A illustrates connectivity between network devices (NDs) within an exemplary network, as well as three exemplary implementations of the NDs, according to some embodiments of the invention.

FIG. 4A illustrates connectivity between network devices (NDs) within an exemplary network, as well as three exemplary implementations of the NDs, according to some embodiments of the invention. FIG. 4A shows NDs 400A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 400A, E, and F illustrates that these NDs act as ingress and egress points for the network (and thus, these NDs are sometimes referred to as edge NDs; while the other NDs may be called core NDs).

Two of the exemplary ND implementations in FIG. 4A are: 1) a special-purpose network device 402 that uses custom application-specific integrated-circuits (ASICs) and a proprietary operating system (OS); and 2) a general purpose network device 404 that uses common off-the-shelf (COTS) processors and a standard OS.

The special-purpose network device 402 includes networking hardware 410 comprising compute resource(s) 412 (which typically include a set of one or more processors), forwarding resource(s) 414 (which typically include one or more ASICs and/or network processors), and physical network interfaces (NIs) 416 (sometimes called physical ports), as well as non-transitory machine readable storage media 418 having stored therein networking software 420. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 400A-H. During operation, the networking software 420 may be executed by the networking hardware 410 to instantiate a set of one or more networking software instance(s) 422. Each of the networking software instance(s) 422, and that part of the networking hardware 410 that executes that network software instance (be it hardware dedicated to that networking software instance and/or time slices of hardware temporally shared by that networking software instance with others of the networking software instance(s) 422), form a separate virtual network element 430A-R. Each of the virtual network element(s) (VNEs) 430A-R includes a control communication and configuration module 432A-R (sometimes referred to as a local control module or control communication module) and forwarding table(s) 434A-R, such that a given virtual network element (e.g., 430A) includes the control communication and configuration module (e.g., 432A), a set of one or more forwarding table(s) (e.g., 434A), and that portion of the networking hardware 410 that executes the virtual network element (e.g., 430A).

Software 420 can include code which when executed by networking hardware 410, causes networking hardware 410 to perform operations of one or more embodiments of the present invention as part networking software instances 422. In one embodiment, the path MTU discovery module 433A can be stored with the networking software 420 and executed with the networking software 422. In a further embodiment, the path MTU discovery module 433A is executed with the control communication and configuration module 432A.

The special-purpose network device 402 is often physically and/or logically considered to include: 1) a ND control plane 424 (sometimes referred to as a control plane) comprising the compute resource(s) 412 that execute the control communication and configuration module(s) 432A-R; and 2) a ND forwarding plane 426 (sometimes referred to as a forwarding plane, a data plane, or a media plane) comprising the forwarding resource(s) 414 that utilize the forwarding table(s) 434A-R and the physical NIs 416. By way of example, where the ND is a router (or is implementing routing functionality), the ND control plane 424 (the compute resource(s) 412 executing the control communication and configuration module(s) 432A-R) is typically responsible for participating in controlling how data (e.g., packets) is to be routed (e.g., the next hop for the data and the outgoing physical NI for that data) and storing that routing information in the forwarding table(s) 434A-R, and the ND forwarding plane 426 is responsible for receiving that data on the physical NIs 416 and forwarding that data out the appropriate ones of the physical NIs 416 based on the forwarding table(s) 434A-R.

Figure 4B:
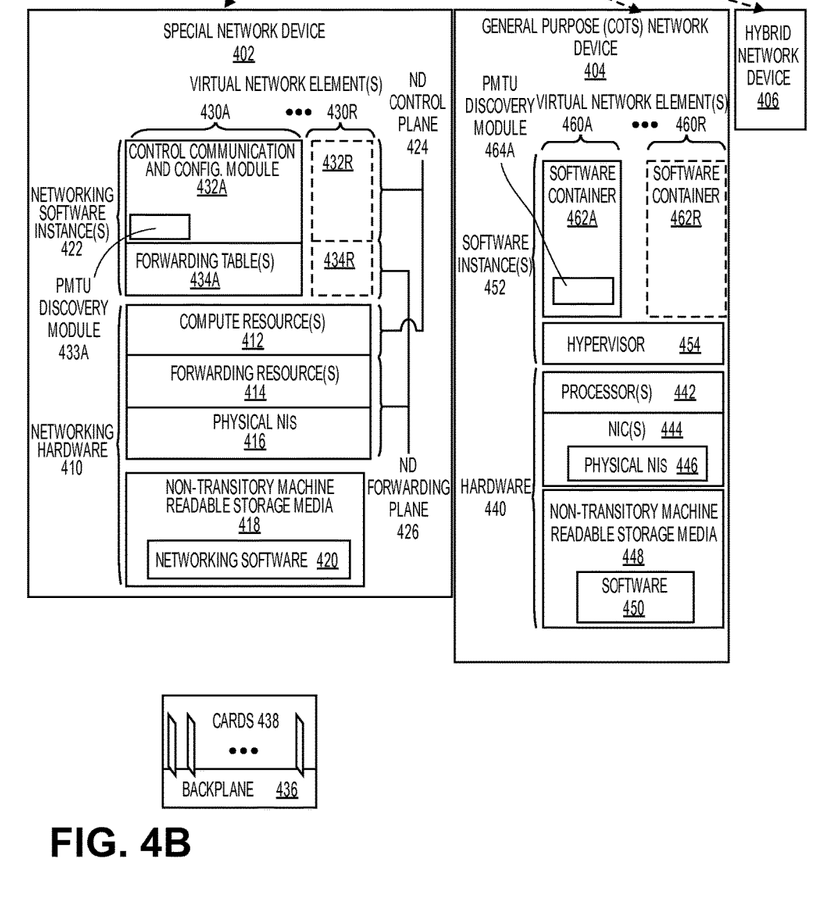
FIG. 4B illustrates an exemplary way to implement a special-purpose network device according to some embodiments of the invention.

FIG. 4B illustrates an exemplary way to implement the special-purpose network device 402 according to some embodiments of the invention. FIG. 4B shows a special-purpose network device including cards 438 (typically hot pluggable). While in some embodiments the cards 438 are of two types (one or more that operate as the ND forwarding plane 426 (sometimes called line cards), and one or more that operate to implement the ND control plane 424 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 436 (e.g., a first full mesh coupling the line cards and a second full mesh coupling all of the cards).

Returning to FIG. 4A, the general purpose network device 404 includes hardware 440 comprising a set of one or more processor(s) 442 (which are often COTS processors) and network interface controller(s) 444 (NICs; also known as network interface cards) (which include physical NIs 446), as well as non-transitory machine readable storage media 448 having stored therein software 450. During operation, the processor(s) 442 execute the software 450 to instantiate one or more sets of one or more applications 464A-R. While one embodiment does not implement virtualization, alternative embodiments may use different forms of virtualization—represented by a virtualization layer 454 and software containers 462A-R. For example, one such alternative embodiment implements operating system-level virtualization, in which case the virtualization layer 454 represents the kernel of an operating system (or a shim executing on a base operating system) that allows for the creation of multiple software containers 462A-R that may each be used to execute one of the sets of applications 464A-R. In this embodiment, the multiple software containers 462A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 454 represents a hypervisor (sometimes referred to as a virtual machine monitor (VMM)) or a hypervisor executing on top of a host operating system; and 2) the software containers 462A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 464A-R, as well as the virtualization layer 454 and software containers 462A-R if implemented, are collectively referred to as software instance(s) 452. Each set of applications 464A-R, corresponding software container 462A-R if implemented, and that part of the hardware 440 that executes them (be it hardware dedicated to that execution and/or time slices of hardware temporally shared by software containers 462A-R), forms a separate virtual network element(s) 460A-R.

The virtual network element(s) 460A-R perform similar functionality to the virtual network element(s) 430A-R—e.g., similar to the control communication and configuration module(s) 432A and forwarding table(s) 434A (this virtualization of the hardware 440 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 462A-R differently. For example, while embodiments of the invention are illustrated with each software container 462A-R corresponding to one VNE 460A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 462A-R to VNEs also apply to embodiments where such a finer level of granularity is used.

In certain embodiments, the virtualization layer 454 includes a virtual switch that provides similar forwarding services as a physical Ethernet switch. Specifically, this virtual switch forwards traffic between software containers 462A-R and the NIC(s) 444, as well as optionally between the software containers 462A-R; in addition, this virtual switch may enforce network isolation between the VNEs 460A-R that by policy are not permitted to communicate with each other (e.g., by honoring virtual local area networks (VLANs)).

Software 450 can include code, which when executed by processor(s) 442, cause processor(s) 442 to perform operations of one or more embodiments of the present invention as part software containers 462A-R. Specifically, the software 450 can encompass the path MTU discovery module 464A, which can in turn be executed along with the software instances 452 in a software container 462A-R.

The third exemplary ND implementation in FIG. 4A is a hybrid network device 406, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 402) could provide for para-virtualization to the networking hardware present in the hybrid network device 406.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 430A-R, VNEs 460A-R, and those in the hybrid network device 406) receives data on the physical NIs (e.g., 416, 446) and forwards that data out the appropriate ones of the physical NIs (e.g., 416, 446). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

Figure 4C:
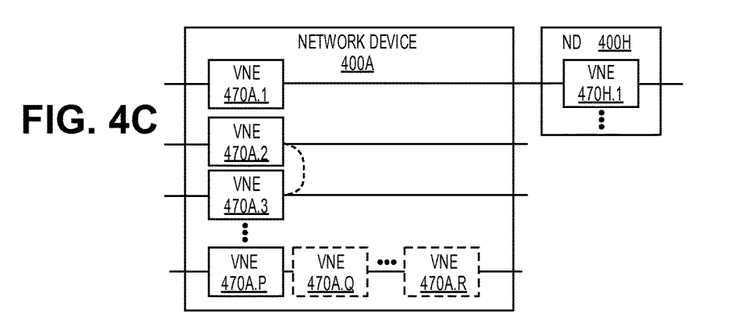
FIG. 4C illustrates various exemplary ways in which virtual network elements (VNEs) may be coupled according to some embodiments of the invention.

FIG. 4C illustrates various exemplary ways in which VNEs may be coupled according to some embodiments of the invention. FIG. 4C shows VNEs 470A.1-470A.P (and optionally VNEs 470A.Q-470A.R) implemented in ND 400A and VNE 470H.1 in ND 400H. In FIG. 4C, VNEs 470A.1-P are separate from each other in the sense that they can receive packets from outside ND 400A and forward packets outside of ND 400A; VNE 470A.1 is coupled with VNE 470H.1, and thus they communicate packets between their respective NDs; VNE 470A.2-470A.3 may optionally forward packets between themselves without forwarding them outside of the ND 400A; and VNE 470A.P may optionally be the first in a chain of VNEs that includes VNE 470A.Q followed by VNE 470A.R (this is sometimes referred to as dynamic service chaining, where each of the VNEs in the series of VNEs provides a different service—e.g., one or more layer 4-7 network services). While FIG. 4C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 4A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 4A may also host one or more such servers (e.g., in the case of the general purpose network device 404, one or more of the software containers 462A-R may operate as servers; the same would be true for the hybrid network device 406; in the case of the special-purpose network device 402, one or more such servers could also be run on a virtualization layer executed by the compute resource(s) 412); in which case the servers are said to be co-located with the VNEs of that ND.

A virtual network is a logical abstraction of a physical network (such as that in FIG. 4A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figures 4D, 4E, 4F:
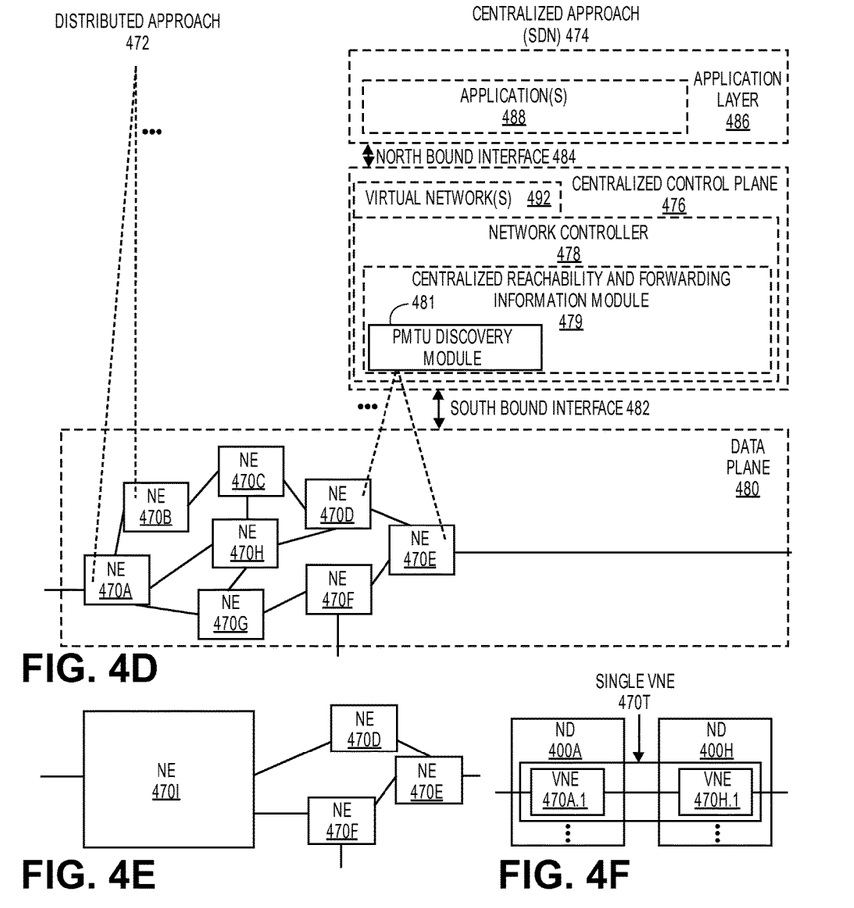
FIG. 4D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.
FIG. 4E illustrates the simple case of where each of the NDs implements a single NE, but a centralized control plane has abstracted multiple of the NEs in different NDs into (to represent) a single NE in one of the virtual network(s), according to some embodiments of the invention.
FIG. 4F illustrates a case where multiple VNEs are implemented on different NDs and are coupled to each other, and where a centralized control plane has abstracted these multiple VNEs such that they appear as a single VNE within one of the virtual networks, according to some embodiments of the invention.

FIG. 4D illustrates a network with a single network element on each of the NDs of FIG. 4A, and within this straight forward approach contrasts a traditional distributed approach (commonly used by traditional routers) with a centralized approach for maintaining reachability and forwarding information (also called network control), according to some embodiments of the invention. Specifically, FIG. 4D illustrates network elements (NEs) 470A-H with the same connectivity as the NDs 400A-H of FIG. 4A.

FIG. 4D illustrates that the distributed approach 472 distributes responsibility for generating the reachability and forwarding information across the NEs 470A-H; in other words, the process of neighbor discovery and topology discovery is distributed.

For example, where the special-purpose network device 402 is used, the control communication and configuration module(s) 432A-R of the ND control plane 424 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP)), Label Distribution Protocol (LDP), Resource Reservation Protocol (RSVP), as well as RSVP-Traffic Engineering (TE): Extensions to RSVP for LSP Tunnels, Generalized Multi-Protocol Label Switching (GMPLS) Signaling RSVP-TE that communicate with other NEs to exchange routes, and then selects those routes based on one or more routing metrics. Thus, the NEs 470A-H (e.g., the compute resource(s) 412 executing the control communication and configuration module(s) 432A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 424. The ND control plane 424 programs the ND forwarding plane 426 with information (e.g., adjacency and route information) based on the routing structure(s). For example, the ND control plane 424 programs the adjacency and route information into one or more forwarding table(s) 434A-R (e.g., Forwarding Information Base (FIB), Label Forwarding Information Base (LFIB), and one or more adjacency structures) on the ND forwarding plane 426. For layer 2 forwarding, the ND can store one or more bridging tables that are used to forward data based on the layer 2 information in that data. While the above example uses the special-purpose network device 402, the same distributed approach 472 can be implemented on the general purpose network device 404 and the hybrid network device 406.

FIG. 4D illustrates that a centralized approach 474 (also known as software defined networking (SDN)) that decouples the system that makes decisions about where traffic is sent from the underlying systems that forwards traffic to the selected destination. The illustrated centralized approach 474 has the responsibility for the generation of reachability and forwarding information in a centralized control plane 476 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 476 has a south bound interface 482 with a data plane 480 (sometime referred to as the infrastructure layer, network forwarding plane, or forwarding plane (which should not be confused with a ND forwarding plane)) that includes the NEs 470A-H (sometimes referred to as switches, forwarding elements, data plane elements, or nodes). The centralized control plane 476 includes a network controller 478, which includes a centralized reachability and forwarding information module 479 that determines the reachability within the network and distributes the forwarding information to the NEs 470A-H of the data plane 480 over the south bound interface 482 (which may use the OpenFlow protocol). Thus, the network intelligence is centralized in the centralized control plane 476 executing on electronic devices that are typically separate from the NDs.

For example, where the special-purpose network device 402 is used in the data plane 480, each of the control communication and configuration module(s) 432A-R of the ND control plane 424 typically include a control agent that provides the VNE side of the south bound interface 482. In this case, the ND control plane 424 (the compute resource(s) 412 executing the control communication and configuration module(s) 432A-R) performs its responsibility for participating in controlling how data (e.g., packets) is to be routed (e.g., the next hop for the data and the outgoing physical NI for that data) through the control agent communicating with the centralized control plane 476 to receive the forwarding information (and in some cases, the reachability information) from the centralized reachability and forwarding information module 479 (it should be understood that in some embodiments of the invention, the control communication and configuration module(s) 432A-R, in addition to communicating with the centralized control plane 476, may also play some role in determining reachability and/or calculating forwarding information—albeit less so than in the case of a distributed approach; such embodiments are generally considered to fall under the centralized approach 474, but may also be considered a hybrid approach).

While the above example uses the special-purpose network device 402, the same centralized approach 474 can be implemented with the general purpose network device 404 (e.g., each of the VNE 460A-R performs its responsibility for controlling how data (e.g., packets) is to be routed (e.g., the next hop for the data and the outgoing physical NI for that data) by communicating with the centralized control plane 476 to receive the forwarding information (and in some cases, the reachability information) from the centralized reachability and forwarding information module 479; it should be understood that in some embodiments of the invention, the VNEs 460A-R, in addition to communicating with the centralized control plane 476, may also play some role in determining reachability and/or calculating forwarding information—albeit less so than in the case of a distributed approach) and the hybrid network device 406. In fact, the use of SDN techniques can enhance the NFV techniques typically used in the general purpose network device 404 or hybrid network device 406 implementations as NFV is able to support SDN by providing an infrastructure upon which the SDN software can be run, and NFV and SDN both aim to make use of commodity server hardware and physical switches. In some embodiments, the PMTUD module 481 can be implemented at the centralized control plane 476 and in some embodiments as part of the centralized reachability and forwarding information module 479.

FIG. 4D also shows that the centralized control plane 476 has a north bound interface 484 to an application layer 486, in which resides application(s) 488. The centralized control plane 476 has the ability to form virtual networks 492 (sometimes referred to as a logical forwarding plane, network services, or overlay networks (with the NEs 470A-H of the data plane 480 being the underlay network)) for the application(s) 488. Thus, the centralized control plane 476 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 4D shows the distributed approach 472 separate from the centralized approach 474, the effort of network control may be distributed differently or the two combined in certain embodiments of the invention. For example: 1) embodiments may generally use the centralized approach (SDN) 474, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 474, but may also be considered a hybrid approach.

While FIG. 4D illustrates the simple case where each of the NDs 400A-H implements a single NE 470A-H, it should be understood that the network control approaches described with reference to FIG. 4D also work for networks where one or more of the NDs 400A-H implement multiple VNEs (e.g., VNEs 430A-R, VNEs 460A-R, those in the hybrid network device 406). Alternatively or in addition, the network controller 478 may also emulate the implementation of multiple VNEs in a single ND. Specifically, instead of (or in addition to) implementing multiple VNEs in a single ND, the network controller 478 may present the implementation of a VNE/NE in a single ND as multiple VNEs in the virtual networks 492 (all in the same one of the virtual network(s) 492, each in different ones of the virtual network(s) 492, or some combination). For example, the network controller 478 may cause an ND to implement a single VNE (a NE) in the underlay network, and then logically divide up the resources of that NE within the centralized control plane 476 to present different VNEs in the virtual network(s) 492 (where these different VNEs in the overlay networks are sharing the resources of the single VNE/NE implementation on the ND in the underlay network).

On the other hand, FIGS. 4E and 4F respectively illustrate exemplary abstractions of NEs and VNEs that the network controller 478 may present as part of different ones of the virtual networks 492. FIG. 4E illustrates the simple case of where each of the NDs 400A-H implements a single NE 470A-H (see FIG. 4D), but the centralized control plane 476 has abstracted multiple of the NEs in different NDs (the NEs 470A-C and G-H) into (to represent) a single NE 4701 in one of the virtual network(s) 492 of FIG. 4D, according to some embodiments of the invention. FIG. 4E shows that in this virtual network, the NE 4701 is coupled to NE 470D and 470F, which are both still coupled to NE 470E.

FIG. 4F illustrates a case where multiple VNEs (VNE 470A.1 and VNE 470H.1) are implemented on different NDs (ND 400A and ND 400H) and are coupled to each other, and where the centralized control plane 476 has abstracted these multiple VNEs such that they appear as a single VNE 470T within one of the virtual networks 492 of FIG. 4D, according to some embodiments of the invention. Thus, the abstraction of a NE or VNE can span multiple NDs.

While some embodiments of the invention implement the centralized control plane 476 as a single entity (e.g., a single instance of software running on a single electronic device), alternative embodiments may spread the functionality across multiple entities for redundancy and/or scalability purposes (e.g., multiple instances of software running on different electronic devices).

Figure 5:
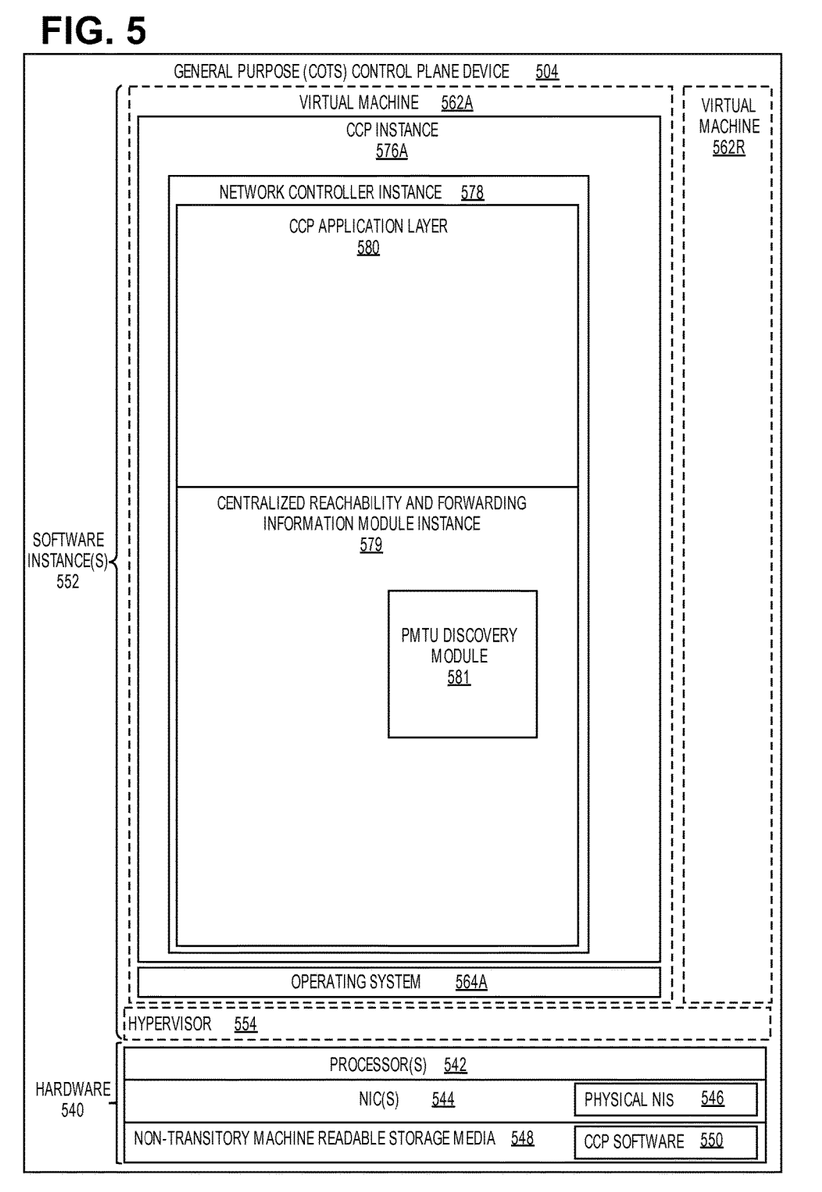
FIG. 5 illustrates a general purpose control plane device with centralized control plane (CCP) software, according to some embodiments of the invention.

Similar to the network device implementations, the electronic device(s) running the centralized control plane 476, and thus the network controller 478 including the centralized reachability and forwarding information module 479, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 5 illustrates, a general purpose control plane device 504 including hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein centralized control plane (CCP) software 550.

In embodiments that use compute virtualization, the processor(s) 542 typically execute software to instantiate a virtualization layer 554 and software container(s) 562A-R (e.g., with operating system-level virtualization, the virtualization layer 554 represents the kernel of an operating system (or a shim executing on a base operating system) that allows for the creation of multiple software containers 562A-R (representing separate user space instances and also called virtualization engines, virtual private servers, or jails) that may each be used to execute a set of one or more applications; with full virtualization, the virtualization layer 554 represents a hypervisor (sometimes referred to as a virtual machine monitor (VMM)) or a hypervisor executing on top of a host operating system, and the software containers 562A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 550 (illustrated as CCP instance 576A) is executed within the software container 562A on the virtualization layer 554. In embodiments where compute virtualization is not used, the CCP instance 576A on top of a host operating system is executed on the "bare metal" general purpose control plane device 504. The instantiation of the CCP instance 576A, as well as the virtualization layer 554 and software containers 562A-R if implemented, are collectively referred to as software instance(s) 552.

In some embodiments, the CCP instance 576A includes a network controller instance 578. The network controller instance 578 includes a centralized reachability and forwarding information module instance 579 (which is a middleware layer providing the context of the network controller 478 to the operating system and communicating with the various NEs), and an CCP application layer 580 (sometimes referred to as an application layer) over the middleware layer (providing the intelligence required for various network operations such as protocols, network situational awareness, and user-interfaces). At a more abstract level, this CCP application layer 580 within the centralized control plane 476 works with virtual network view(s) (logical view(s) of the network) and the middleware layer provides the conversion from the virtual networks to the physical view. In some embodiments, the PMTUD module 581 can be implemented at the CCP instance 576A and in some embodiments as part of the centralized reachability and forwarding information module 579.

The centralized control plane 476 transmits relevant messages to the data plane 480 based on CCP application layer 580 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 480 may receive different messages, and thus different forwarding information. The data plane 480 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 480, the packet (or a subset of the packet header and content) is typically forwarded to the centralized control plane 476. The centralized control plane 476 will then program forwarding table entries into the data plane 480 to accommodate packets belonging to the flow of the unknown packet. Once a specific forwarding table entry has been programmed into the data plane 480 by the centralized control plane 476, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method for path maximum transmission unit (PMTU) discovery (PMTUD) for a multicast distribution implemented in a network using bit indexed explicit replication (BIER) architecture, the network having a set of bit forwarding routers (BFRs) that form a BIER domain including at least one ingress BFR (BFIR) and a set of egress BFRs (BFERs), the method improving efficiency of the PMTUD by limiting probe packet traffic, the method comprising:
   selecting a BFER from the set of BFERs in the BIER domain to be processed;
   generating a probe packet to the selected BFER using a current MTU;
   sending the probe packet to the selected BFER; and
   updating the current MTU and adding BFERs identified by a response to the probe packet to the set of BFERs in the BIER domain to be processed.

2. The method of claim 1, further comprising:
   receiving the response to the probe packet, where the response includes a bit mask set that identifies BFERs that cannot receive the current MTU.

3. The method of claim 1, further comprising:
   removing the BFER from the set of BFERs in the BIER domain to be processed in response to a positive acknowledgement being received.

4. The method of claim 1, further comprising:
   checking whether the set of BFERs in the BIER domain to be processed is empty; and
   utilizing the current MTU for the multicast distribution in response to all of the BFERs in the BIER domain being processed.

5. The method of claim 1, wherein updating the current MTU reduces the current MTU size to find a path MTU that can be used to reach all of the BFERs in the BIER domain.

6. A network device for implementing a method for path maximum transmission unit (PMTU) discovery (PMTUD) for a multicast distribution implemented in a network using bit indexed explicit replication (BIER) architecture, the network having a set of bit forwarding routers (BFRs) that form a BIER domain including at least one ingress BFR (BFIR) and a set of egress BFRs (BFERs), the method improving efficiency of the PMTUD by limiting probe packet traffic, the network device comprising:
   a non-transitory machine-readable storage medium having stored therein a PMTUD module; and
   a network processor coupled to the non-transitory machine-readable storage medium, the network processor configured to execute the PMTUD module, the PMTUD module configured to select a BFER from the set of BFERs in the BIER domain to be processed, to generate a probe packet to the selected BFER using a current MTU, to send the probe packet to the selected BFER, and to update the current MTU and to add BFERs identified by a response to the probe packet to the set of BFERs in the BIER domain to be processed.

7. The network device of claim 6, wherein the network processor is further configured to execute the PMTU module to receive the response to the probe packet, where the response includes a bit mask set that identifies BFERs that cannot receive the current MTU.

8. The network device of claim 6, wherein the network processor is further configured to execute the PMTU module to remove the BFER from the set of BFERs in the BIER domain to be processed in response to a positive acknowledgement being received.

9. The network device of claim 6, wherein the network processor is further configured to execute the PMTU module to check whether the set of BFERs in the BIER domain to be processed is empty and to utilize the current MTU for the multicast distribution in response to all of the BFERs in the BIER domain being processed.

10. The network device of claim 6, wherein updating the current MTU reduces the current MTU size to find a path MTU that can be used to reach all of the BFERs in the BIER domain.

11. A computing device to execute a plurality of virtual machines for implementing network function virtualization (NFV), wherein a virtual machine from the plurality of virtual machines is configured to implement a method for path maximum transmission unit (PMTU) discovery (PMTUD) for a multicast distribution implemented in a network using bit indexed explicit replication (BIER) architecture, the network having a set of bit forwarding routers (BFRs) that form a BIER domain including at least one ingress BFR (BFIR) and a set of egress BFRs (BFERs), the method improving efficiency of the PMTUD by limiting probe packet traffic, the computing device comprising:
   a non-transitory machine-readable storage medium having stored therein a PMTUD module; and
   a processor coupled to the non-transitory machine-readable storage medium, the processor configured to execute a virtual machine from the plurality of virtual machines, the virtual machine to execute the PMTUD module, the PMTUD module configured to select a BFER from the set of BFERs in the BIER domain to be processed, to generate a probe packet to the selected BFER using a current MTU, to send the probe packet to the selected BFER, and to update the current MTU and to add BFERs identified by a response to the probe packet to the set of BFERs in the BIER domain to be processed.

12. The computing device of claim 11, wherein the processor is further configured to execute the PMTU module to receive the response to the probe packet, where the response includes a bit mask set that identifies BFERs that cannot receive the current MTU.

13. The computing device of claim 11, wherein the processor is further configured to execute the PMTU module to remove the BFER from the set of BFERs in the BIER domain to be processed in response to a positive acknowledgement being received.

14. The computing device of claim 11, wherein the processor is further configured to execute the PMTU module to check whether the set of BFERs in the BIER domain to be processed is empty and to utilize the current MTU for the multicast distribution in response to all of the BFERs in the BIER domain being processed.

15. The computing device of claim 11, wherein updating the current MTU reduces the current MTU size to find a path MTU that can be used to reach all of the BFERs in the BIER domain.

16. A control plane device is configured to implement a control plane of a software defined networking (SDN) network including a plurality of network devices forming a content centric network, the control plane device implementing a method for path maximum transmission unit (PMTU) discovery (PMTUD) for a multicast distribution implemented in a network using bit indexed explicit replication (BIER) architecture, the network having a set of bit forwarding routers (BFRs) that form a BIER domain including at least one ingress BFR (BFIR) and a set of egress BFRs (BFERs), the method improving efficiency of the PMTUD by limiting probe packet traffic, the control plane device comprising:

a non-transitory machine-readable storage medium having stored therein a PMTUD module; and a processor coupled to the non-transitory machine-readable storage medium, the processor configured to execute the PMTUD module, the PMTUD module configured to select a BFER from the set of BFERs in the BIER domain to be processed, to generate a probe packet to the selected BFER using a current MTU, to send the probe packet to the selected BFER, and to update the current MTU and to add BFERs identified by a response to the probe packet to the set of BFERs in the BIER domain to be processed.

17. The control plane device of claim 16, wherein the processor is further configured to execute the PMTU module to receive the response to the probe packet, where the response includes a bit mask set that identifies BFERs that cannot receive the current MTU.

18. The control plane device of claim 16, wherein the processor is further configured to execute the PMTU module to remove the BFER from the set of BFERs in the BIER domain to be processed in response to a positive acknowledgement being received.

19. The control plane device of claim 16, wherein the processor is further configured to execute the PMTU module to check whether the set of BFERs in the BIER domain to be processed is empty and to utilize the current MTU for the multicast distribution in response to all of the BFERs in the BIER domain being processed.

20. The control plane device of claim 16, wherein updating the current MTU reduces the current MTU size to find a path MTU that can be used to reach all of the BFERs in the BIER domain.

* * * * *